June 10, 1952 H. J. ELLIOTT 2,599,702
RECORDING ANNUNCIATOR

Original Filed Aug. 21, 1944 6 Sheets-Sheet 1

CAPTAIN'S BRIDGE

ENGINE ROOM

ENGINE ROOM

CAPTAIN'S BRIDGE

Henry J. Elliott,
INVENTOR.

BY
Victor J. Evans & Co.
ATTORNEYS

June 10, 1952     H. J. ELLIOTT     2,599,702
RECORDING ANNUNCIATOR

Original Filed Aug. 21, 1944     6 Sheets-Sheet 2

INVENTOR
Henry J. Elliott
BY
Victor J. Evans + Co.
ATTORNEYS

June 10, 1952      H. J. ELLIOTT      2,599,702
RECORDING ANNUNCIATOR
Original Filed Aug. 21, 1944      6 Sheets-Sheet 3
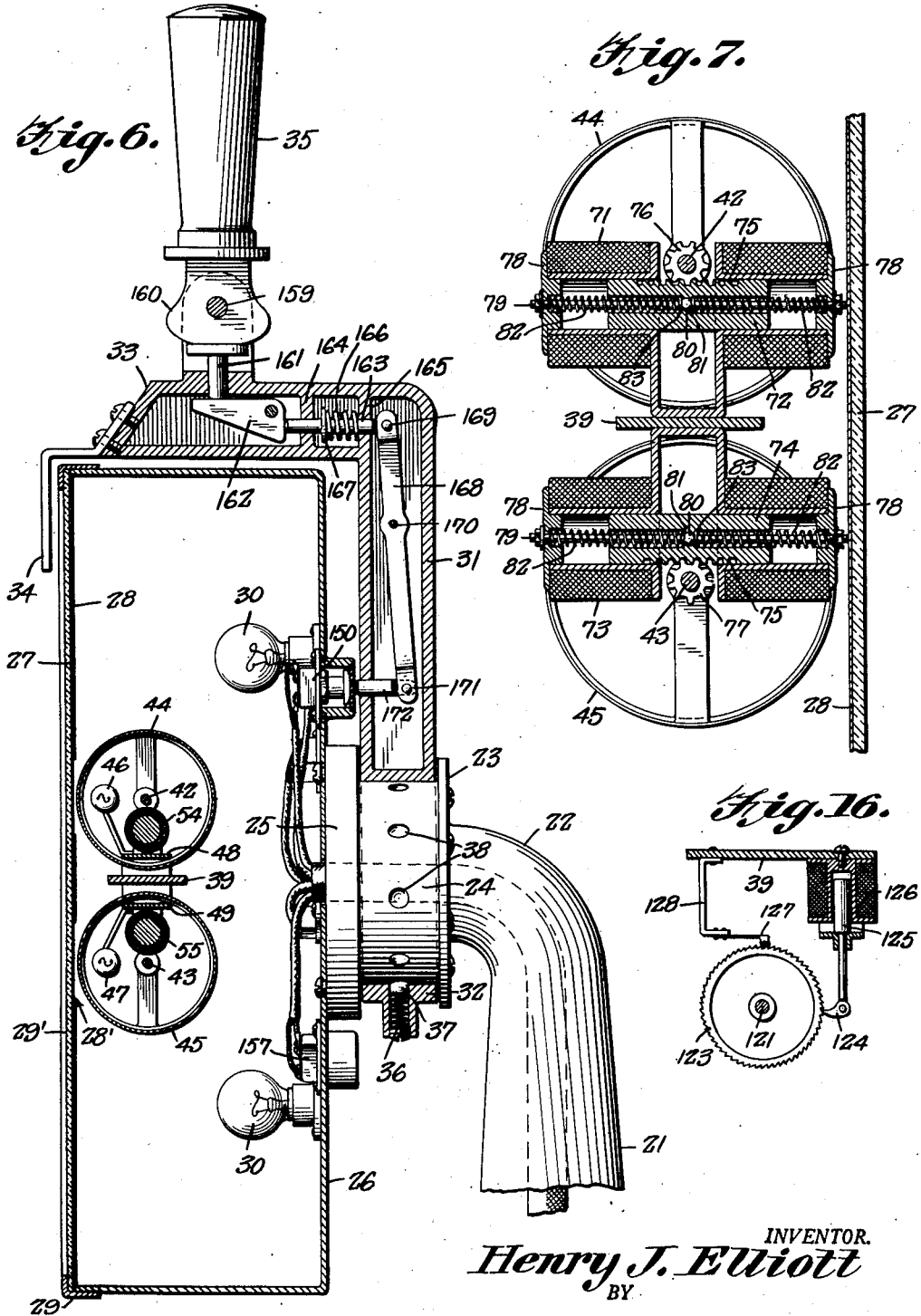
INVENTOR.
*Henry J. Elliott*
BY
*Victor J. Evans & Co.*
ATTORNEYS June 10, 1952  H. J. ELLIOTT  2,599,702
RECORDING ANNUNCIATOR
Original Filed Aug. 21, 1944  6 Sheets-Sheet 4

Henry J. Elliott,
INVENTOR.

BY
Victor J. Evans & Co.
ATTORNEYS

June 10, 1952  H. J. ELLIOTT  2,599,702
RECORDING ANNUNCIATOR

Original Filed Aug. 21, 1944  6 Sheets-Sheet 5

Henry J. Elliott,
INVENTOR.

BY
Victor J. Evans & Co.
ATTORNEYS

June 10, 1952  H. J. ELLIOTT  2,599,702
RECORDING ANNUNCIATOR
Original Filed Aug. 21, 1944  6 Sheets-Sheet 6
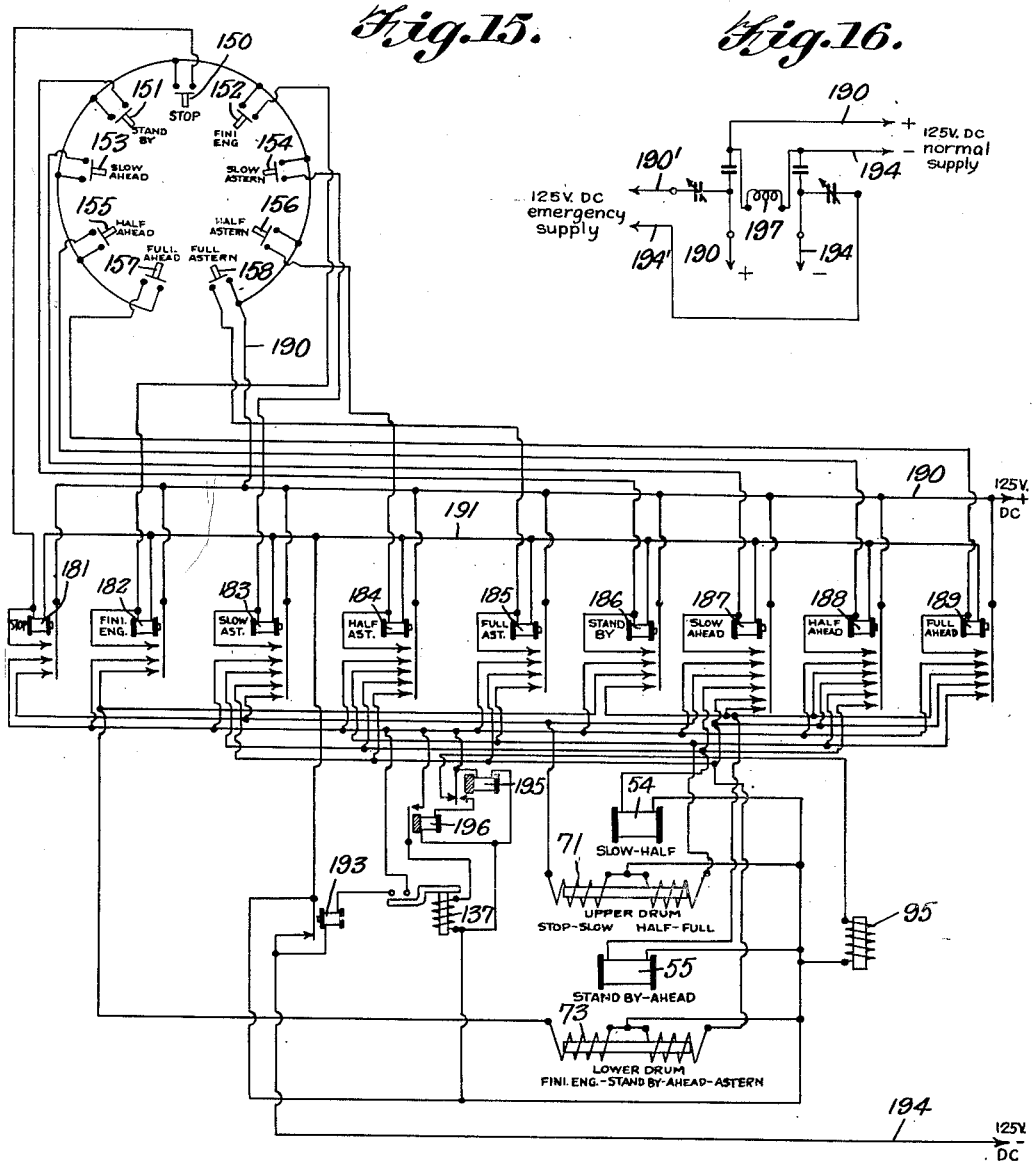
Henry J. Elliott,
INVENTOR.
BY
Victor J. Evans & Co.
ATTORNEYS Patented June 10, 1952

2,599,702

UNITED STATES PATENT OFFICE 2,599,702

RECORDING ANNUNCIATOR

Henry J. Elliott, Fontana, N. C.

Continuation of application Serial No. 550,408, August 21, 1944. This application February 7, 1950, Serial No. 142,751

3 Claims. (Cl. 177—337)

This is a continuing application being continued from my former application with the Serial No. 550,408 filed August 21, 1944, now abandoned.

The invention relates to monitorial recorders generally and has for an object to provide a two-way recording annunciator and system of electrical transmission of orders or signals between distant points within a given zone of operations requiring directive control from a point or station of command to a point or station of operations performance.

Another object of the invention has to do with the provision of an apparatus and system as aforesaid, which will record the nature of an order or signal transmitted electrically to a distant point and the time of its reception at the distant point from the point of origin and likewise the nature of an acknowledgment of or answer to such order or signal and the time of the receipt thereof from the distant point at the point of origin.

A further object of the invention resides in the inclusion in this apparatus and system of means for visually indicating the nature of an order or signal at the distant point to which it is transmitted and to likewise visually indicate the nature of the acknowledgment or answer from the distant point at the point of origin of the order or signal.

Yet another object of the invention is to incorporate within this apparatus and system an automatic audible signal that will operate to give warning at the distant point when the transmission of an order or signal is initiated at the point of command and which will continue in operation until an acknowledgment of or answer to such order or signal is to the point of origin of the latter.

A further object of the instant invention is to extend the scope of usefulness of and to otherwise improve upon the Electric Direction Indicator forming the subject matter of my Letters Patent numbered 2,223,678 which was granted to me on December 3, 1940.

A still further object of the invention is to provide an apparatus and system embodying the features and functions enumerated herein which will be highly efficient in operation and reduce, if not entirely eliminate, the chance for error in order or signal transmission and reception to an absolute minimum and under any and all conditions of its use.

With these and other objects of equal importance in view, the invention resides in the certain new and useful combination, construction and arrangement instrumentalities, parts and circuits, as will be hereinafter more fully described, set forth in the appended claims, and illustrated in the accompanying drawings, in which:

Figure 6 is an enlarged vertical section taken on the line 6—6 of Figure 5;

Figure 7 is an enlarged vertical section taken on the line 7—7 of Figure 5;

Figure 1:
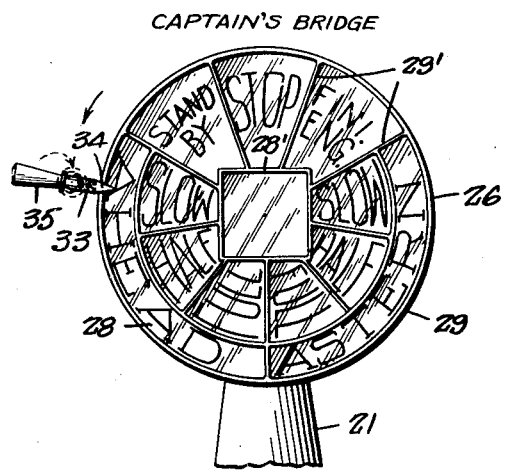
Figure 1 is a front elevation of a combined transmitter and visual indicator located at a point of command, and showing the transmitter controller set to an order or signal transmitting position, with the indicator in a condition of readiness to visualize the acknowledgment of or answer to be made from a distant point of reception of the order or signal transmitted.
Figure 2:
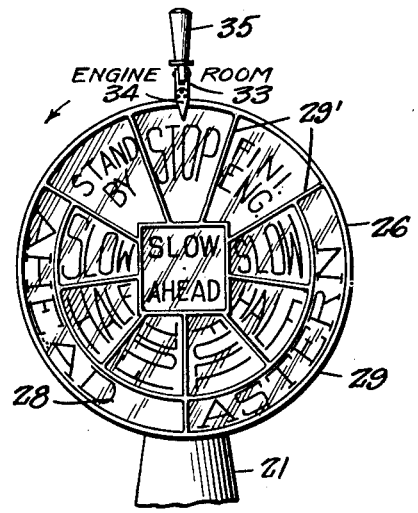
Figure 2 is a view similar to that of Figure 1, but showing an identical transmitter and indicator combination to be located at distant point from the command controller and indicator combination, wherein its transmitter controller is set at a previous position of operation and the indicator is visualizing the order or signal being transmitted by the command controller.
Figure 3:
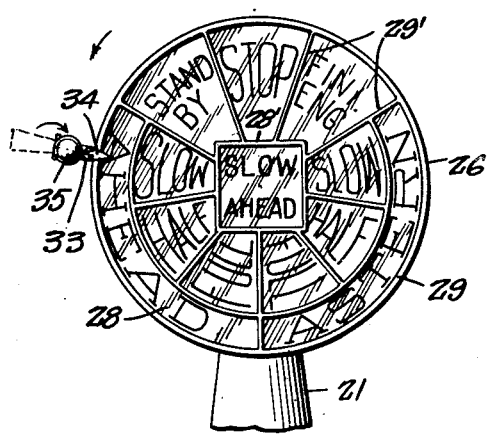
Figure 3 is another similar view, but showing the transmitter controller of the apparatus of Figure 2 after it has been moved from its previous position to a position of acknowledgment of or answer to the received and visualized order or signal.
Figure 4:
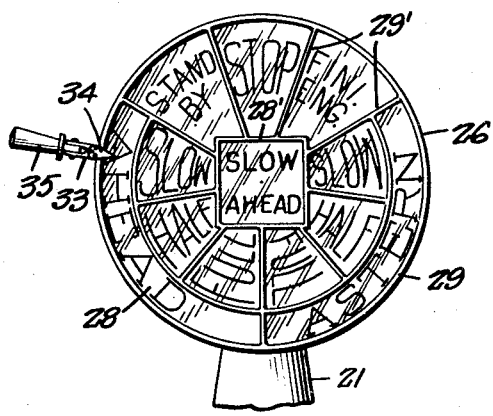
Figure 4 is yet another similar view, but showing the indicator of the apparatus as in Figure 1 now visualizing the acknowledgment or answer made by the apparatus located at the distant point, which acknowledgment or answer conforms to the order or signal transmitted originally from the apparatus at the point of command.

Figure 15 is a diagram of the electrical circuits connecting the several instrumentalities of the apparatus in their operative relation and to a power line, and Figure 16 is a diagrammatical view of the relay for effecting the transfer of the main current supply circuit of the apparatus from a normal D. C. source to an emergency D. C. source.

Referring to the drawings, wherein like characters of reference denote corresponding parts throughout the several views, the embodiment of the invention, as is exemplified therein, is generally comprised in an electrical system of station-to-station communication for the transmission of orders or signals from a station or point of command to a station or point of reception and the transmission to the station or point of command from the station or point of reception of an acknowledgment or answer to such order or signal; each of the stations being equipped with identical apparatus that is self-contained with respect to an order or signal transmitter; a visual annunciator or indicator of the order or signal transmitted and acknowledged or answered; an audible warning alarm or signal and acknowledgment or answer transmission; and a printing mechanism for making a permanent record of each order or signal transmitted and of each acknowledgment or answer made thereto and the time that each is initiated; and, while the system and apparatus is capable of a more general station-to-station adaptation, it is here designed for marine use, for instance, on shipboard for communication between the command bridge or station and the engine room, by the use of legends that are indicative of the orders commonly issued by a ship's navigator to the engineer in charge of engine operations, and hence will be so described.

The apparatus for each station is comprised in a suitable support that preferably takes the form of a pedestal 21 made of hollow metal tapering upwardly from a substantial footing and terminating in a right angled portion or gooseneck 22 at its upper end, as in Figures 6 and 7. The free end of the angled portion 22 is flanged, as at 23, for the securement thereof of a cylindrical bearing element 24 which has its outer end similarly flanged, as at 25, for the securement to the same of a hollow cylindrical casing 26 that is open at its front side. The open front of the casing 26 is closed by a transparent cover plate 27 which is held in place by a detachable retaining rim 29 engaged over the edge of the casing about the opening. Positioned immediately in rear of the cover plate 27 is an opaque disc 28 in which suitable legends are stenciled for observation through the cover plate 27. These legends are arranged about a central rectangular area 28' of the opaque disc 28 from which two oblong cutouts are removed for the exposure therethrough of certain other and related legends, during each operation of the apparatus, as will be hereinafter fully explained.

The dial face, thus formed by the cover plate 27 and the opaque disc 28, will preferably be protected by a grill 29' formed within the opening of the rim 29 in a manner to in no way obscure the legends from view but rather divide the dial face into a number of framed areas to constitute "sight windows" through which individual legends are more easily discernible, one from the other; a center portion of the grill likewise frames the rectangular area 28' for the observation therethrough of the said other and related legends to be exposed through the oblong cutouts in the corresponding areas of the opaque disc 28. For marine use, beginning at the top center of the dial face, the legends should read:

"Stop," and downward therefrom, to the left side of the dial face, "Stand By"; "Slow"; "Half"; and "Full"; and to the side of the dial face, "Finished With Engines"; "Slow"; "Half"; and "Full"; all in the order given; the left half of the dial face having the designation "Ahead" and the right half "Astern."

Electric lamps 30 are mounted within the casing 26 to illuminate these legends separately from those which are to be exposed at the cutouts in the rectangular area 28' of the opaque disc 28.

Mounted for 360 degree turning movements about the casing 26 is a controller of angular form, with one arm 31 made longer than its other arm 33; the longer arm 31 having its free end provided with an annular hub 32 that is journalled on the bearing 24 at the rear of the casing, and the shorter arm 33 extending forwardly across the periphery of the casing to support an index or pointer 34 for movement about the dial face at the front side of the casing. A handle 35 is mounted on the top side of the shorter arm 33 for manipulating the controller as required. To retain the controller arm 31—33 in any one of its operation positions, the hub 32 is provided with a spring (36) actuated detent 37 that snaps into and out of engagement with a series of depressions 38 formed in the peripheral surface of the bearing 24, the detent 37 preferably taking the form of a steel ball, as is shown in Figure 6. The seating of the detent 37 in any one of the depressions 38, upon stoppage of the controller at an order or signal indicating position of the index or pointer 34, with reference to the associated dial at the front side of the casing 26, is sufficient to hold the controller against unintended movement from set position.

Extending diametrically of the casing 26 and horizontally of the same is a main support member 39, to the upper and lower sides of which are secured pairs of bearing brackets 40 and 41, respectively; the brackets of each pair being spaced apart to either side of the transverse center of the support member 39 for the journaling in the same of parallel shafts 42 and 43. Mounted on the upper shaft 42, between the brackets 40, is a signal drum 44, and on the lower shaft 43, between the brackets 41, a signal drum 45, in which positions, the signal drums 44 and 45, are centered with respect to the upper and lower of the oblong cutouts in the central rectangular area 28' of the opaque disc 28, at the rear of the transparent cover plate 27. The signal drums 44 and 45, in accordance with the specific disclosure of the invention herein, will have legends, corresponding to those stenciled in the opaque disc 28, similarly formed in their peripheral surfaces for exposure at the cutouts at the center of the latter, the upper drum 42, the legends: "Stop"; "Slow"; "Half" and "Full"; and the lower drum 43, the legends, "Finished With Engines"; "Stand By"; "Ahead" and "Astern."

The interiors of the drums 44 and 45, are separately illuminated by electric lamps 46 and 47, respectively, for making the legends clearly visible at all times from in front of the dial.

Figure 13:
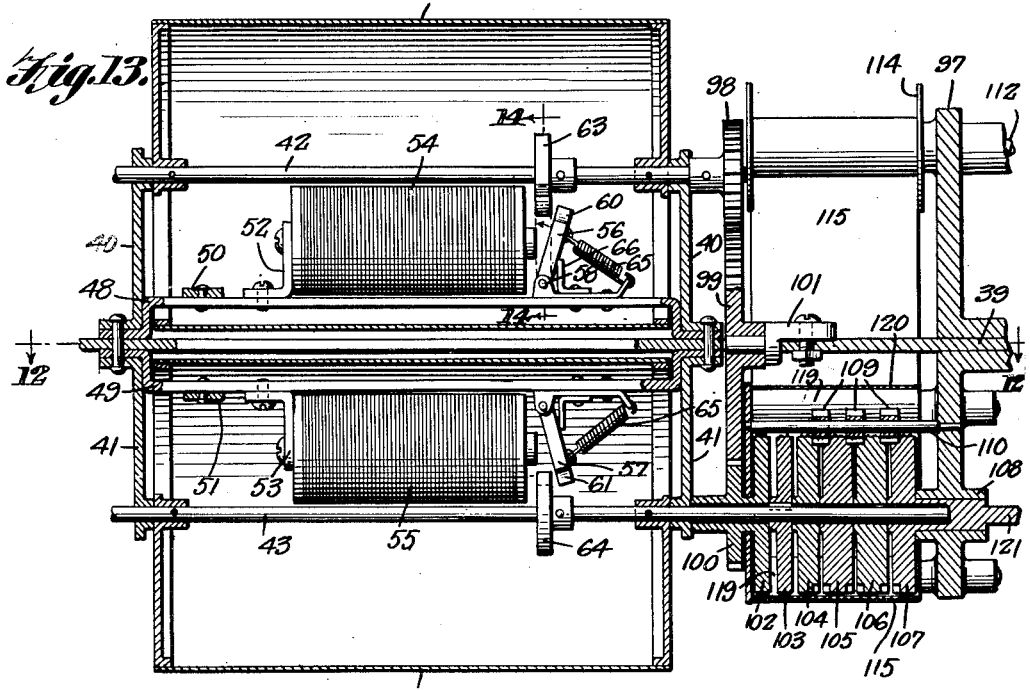
Figure 13 is a vertical transverse sectional detail taken on the line 13—13 of Figure 12.
Figure 14:
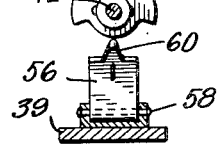
Figure 14 is a vertical transverse sectional detail taken on the line 14—14 of Figure 13.

Mounted on the upper and lower sides of the main support 39, and having common securement thereto with the pairs of bearing brackets 40 and 41, are elongated U-shaped supports 48 and 49, which extend through the drums 44 and 45, substantially as shown in Figure 13. Angled bracket arms 50 and 51 extend to one side of the brackets 48, and 49, and from the supports 48 and 49, and support the electric lamps 46 and 47 in position to illuminate the legends on the drums 44 and 45, when the same are moved into registry with the cutouts in the dial face 27 and 28. Secured on the brackets 40 and 41, to one side of the bracket arms 50 and 51, are angled brackets 52 and 53, to which are secured electromagnets 54 and 55; the armatures 56 and 57, which are hinged, as at 58, to the brackets 40 and 41. As shown in Figures 13 and 14, these armatures 56 and 57 are formed with V-shaped projections 60 and 61, at their free ends for co-operation with peripheral cutouts 62 of wheels 63 and 64, mounted on the shafts 42 and 43, respectively, to control certain of the operative movements of the signal drums 44 and 45; the armatures 56 and 57 being normally held out of engagement with the cutouts 62 by coiled springs 65 and against stops 66 mounted on the brackets 48 and 49.

Figure 5:
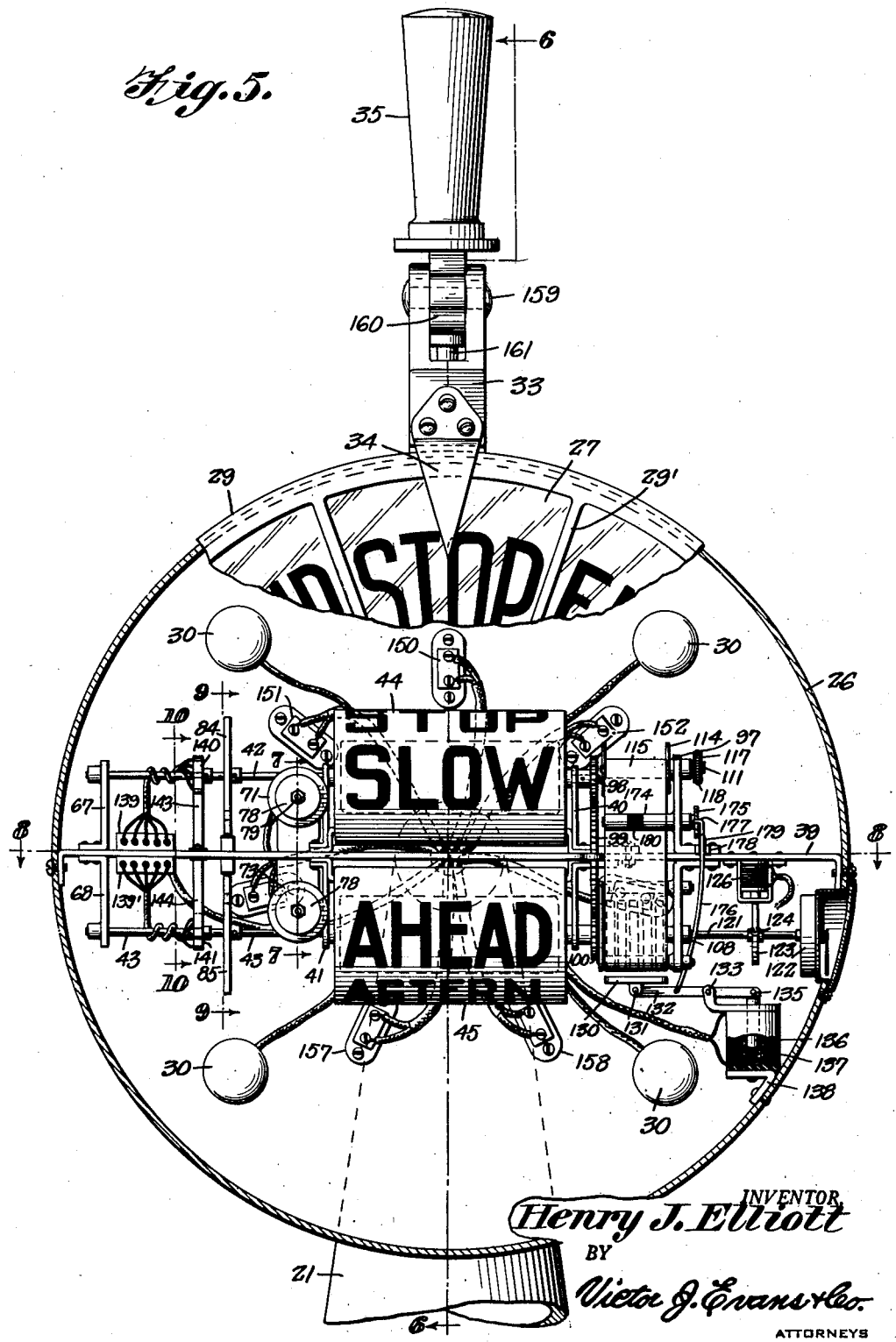
Figure 5 is an enlarged front elevation of the apparatus shown in Figures 1 to 4, but a portion of the order or signal dial broken away to show the mechanism for indicating the nature of orders or signals transmitted, received and acknowledged, between widely separated apparatus.
Figure 8:
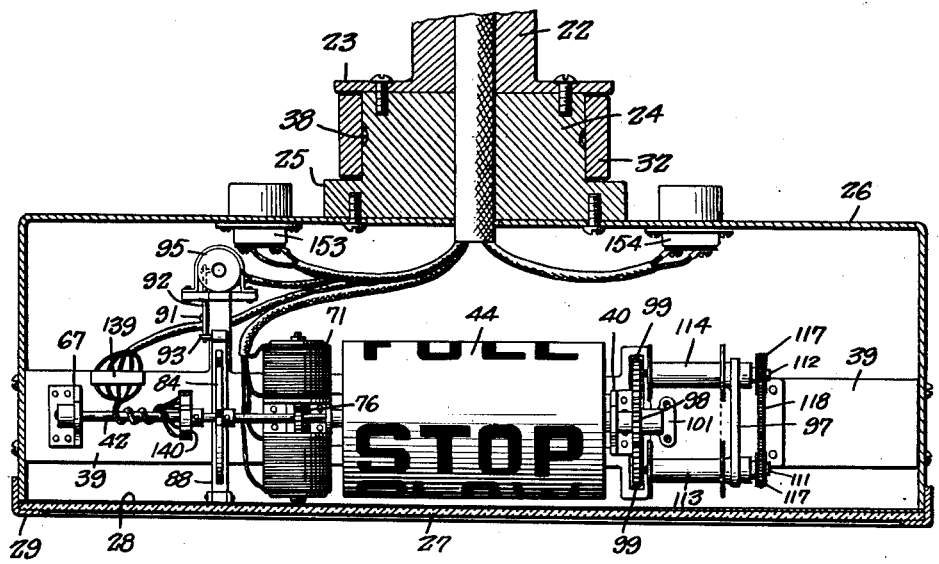
Figure 8 is a horizontal section taken on the line 8—8 of Figure 5.

The shafts 42 and 43 extend from their respective bearing brackets 40 and 41, to have their left hand ends journaled in bearing brackets 67 and 68 secured, respectively, to the upper and lower sides of the main support 39 adjacent its attachment to the casing 26, as is best shown in Figures 5 and 8. Mounted on supports 69 and 70, at the upper and lower sides of the main support 39 and immediately to the left of the signal drums 44 and 45 are solenoids 71 and 73 respectively, the coils of each pair being disposed in axial alignment transversely of the signal drums 44 and 45 so that the axis of each pair is at right angles to a complemental of the shafts 42 and 43. The pairs of solenoids 71 and 73 are provided with armatures 72 and 74, respectively, which have limited movements endwise within the open centers of the coils, the individual coils of each pair being spaced apart to either side of a respective of the shafts 42 and 43. Rack teeth 75 are formed on the upper and lower surfaces of the armatures 72 and 74, and mesh with respective pinions 76 and 77, keyed on the shafts. When an armature is moved endwise in either direction, upon energization of its related coils, which movements are limited by stops constituted in the caps 78 closing the outer ends of the coil centers, a complemental of the shafts 42 and 43, and of the signal drums 44 and 45 is rotated. For yieldingly holding each of the armatures 72 and 74 in neutrally centered relation to the coil pairs, a rod 79 is passed through a longitudinal bore in each of the armatures and has its ends secured in the stop caps 78. Each rod 79 is provided with a central annular enlargement 80 which is disposed within an annular collar 81 at the center of an armature bore. A pair of helical springs 82 are sleeved on the rod 79, with their outer end bearing against the stop caps 78 and their inner ends against respective washers 83 disposed loosely on the rod at opposite sides of the enlargement 80. Thus, upon movement of an armature in either direction, one or the other of its associated springs 82 will be compressed and, at the same time, the complemental of the shafts 42 and 43, and its signal drum, will be rotated. When the operating solenoid is de-energized, the compressed spring will act to return the armature and the signal drum to neutral positions.

Figure 9:
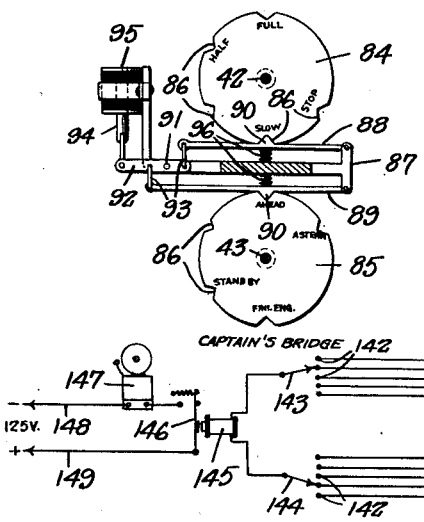
Figure 9 is an enlarged sectional detail taken on the line 9—9 of Figure 5.

Mounted on the main support 39, to the left of the solenoids 71 and 73 is a brake mechanism, best shown in Figure 9, that is comprised in two brake wheels 84 and 85, keyed on the shafts 42 and 43, respectively, and which are each provided with five V-shaped notches 86, in their respective peripheries. Interposed between the brake wheels 84 and 85, is a T-shaped bracket 87, to the ends of the cross-arm of which are pivoted brake arms 88 and 89, which extend parallel to the long arm of the bracket 87, the brake arm 88 having a V-shaped projection 90 formed medially of its upper side for engagement with the notches 86 of the brake wheel 84 and the brake arm 89 a like projection on its lower side for engagement with the notches of the brake wheel 85. Pivoted on the free end of the long arm of the bracket 87, as at 91, is an actuating lever 92 having link connections 93 with the free ends of the brake arms 88 and 89, one at each side of the pivot 91; the outer end of the lever 92 being, in turn, pivoted to the movable armature 94 of a solenoid 95. Interposed between each of the brake arms 88 and 89 and the long arm of the bracket 87, in line with the projections 90, are spring elements 96 which function to hold the latter in contact with the peripheries of the brake wheels 84 and 85, when the brake arms are at rest. Upon the energizing of the solenoid 95, its armature 94 actuates the lever 92 and causes it to move the brake arms 88 and 89, for the withdrawal of the projections 90 from engaged notches 86 of the brake wheels 84 and 85, thus releasing the shafts 42 and 43, for the rotation of the signal drums 44 and 45, when the shafts are actuated by the solenoids 71 and 72.

Positioned on the main support 39, to the right hand side of the signal drums 44 and 45, is a recording mechanism for making permanent records of order or signal acknowledgments of receipt of such orders or signals from a distant point or station, and the same is comprised in a frame 97 which is supported transversely of the main support 39 in spaced relation to the adjacent ends of the signal drums. For the synchronous operating of the recording mechanism with the signal drums 44 and 45, which is accomplished through the medium of the shafts 42 and 43, the upper shaft 42 is extended beyond the right hand bearing bracket 40 sufficiently to have a gear 98 keyed thereto to mesh with an intermediate gear 99 which, in turn, meshes with a gear 100 on the extended end of the lower shaft 43. For mounting the intermediate gear 99 in its relation to the gears 98 and 100, the main support 39 is severed at this point and has a bearing 101 secured to the free end of its right hand portion in which the intermediate gear is journaled. The lower shaft 43 is extended through the gear 100 for the mounting thereon of a number of type wheels, of which six are employed for the purposes of the present disclosure of the invention, the same being designated 102; 103; 104; 105; 106 and 107. The free end of this extended portion of the lower shaft 43 has bearing in the hub of the type wheel 107, after its passage through the hubs of the other of the type wheels; the hub of the type wheel 107 being journaled in a bearing 108 in the frame 97.

The gear 100 is loosely mounted on the lower shaft 43 and is in connection with the hub of the adjacent type wheel 102 which is freely rotatable on the hub of the adjoining type wheel 103, the latter being keyed to the shaft 43. The type wheels 104; 105; 106; and 107 are also freely rotatable on the lower shaft 43 but are cooperatively interconnected for sequential rotation, one from the other, beginning with the type wheel 107, through the medium of the elements 109 carried on a shaft 110 that is journaled in opposed portions of the frame 97, after the manner as shown in Figure 13. The type wheel 102 has its periphery engraved with legends corresponding to those on the upper signal drum 44, and the type wheel 103 with legends corresponding to those on the lower signal drum 45, while the type wheel 104 is engraved with week-day designations; the type wheel 105 with hour designations; the type wheel 106 with A. M. and P. M. designations; and the type wheel 107 with minute designations. Additional type wheels (not shown) may be employed and engraved with year date, month and second designation, if desired.

Journaled in the frame 97, at the corners of its top side, are shafts 111 and 112, on which are keyed reels or spools 113 and 114, respectively, the reel or spool 113 carrying a roll of paper tape 115 that is to be wound onto the reel or spool 114, when the recording mechanism is in operation. The ends of the shafts 111 and 112, to the right of the frame 97, are provided with pulleys 116 and 117, respectively, to receive a wrapping connector 118, which preferably takes the form of an endless coil spring, as shown in Figures 8 and 15, to assure of positive rotative motion of the reels or spools 113 and 114, and a consequent uniform feeding of the paper tape 115. Projecting from the left side of the frame 97, in both horizontally and vertically spaced relation, are four spindles upon which rollers 119 are rotatively supported for the training about the same of an endless inked ribbon 120, the latter being also trained about the lower peripheries of the several type wheels. The paper tape 115 passes downwardly from the supply reel or spool 113 and is trained about the lower pair of the rollers 119 and the type wheels, in contact with the inked ribbon 120, passing from thence to the reel or spool 114, upon which it is to be wound, during the progress of record printing operations.

For the recording of the time of receipt of orders or signals, or acknowledgments thereof, coming from a distant point or station, a shaft 121 is extended from the hub of the type wheel 107 and connects the mechanism of a clock 122, which may be conveniently mounted in a wall of the casing 26. The clock 122, when the instant apparatus is adapted to marine use, will take the form of one having an electric self-winding marine escapement (not shown) and to operate on a D. C. supply. However, an electrically or manually wound clock may be employed for other than marine use, or the shaft 121 may be connected to a master clock (not shown) if one be available for the purpose. Mounted on the shaft 121 is a ratchet wheel 123, with the toothed periphery of which a dog 124 is cooperative and is carried on the free end of the armature 125 of a solenoid 126 to that end, the solenoid 126 being mounted on the lower side of the main support 39. The ratchet wheel 123 is provided with 60 teeth on its periphery and the travel of the armature 125, and consequently of the dog 124, is one and a half times the tooth pitch. A hold-back roller 127 is spring supported from a bracket 128 that is secured to the under side of the main support 39 and cooperates with the teeth on the ratchet wheel 123 to prevent its movement, except when the solenoid 126 is energized to advance the minute type wheel 107.

Associated with the type wheels is a frame 129, which has its lower face engraved with the name and location of the station from which the order or signal was transmitted or repeated, so that this data is recorded along with that of the type wheels, at each setting of the latter, when the paper tape 115 and the inked ribbon 117 is pressed against the printing surfaces of the same by a platen 130 that is movably positioned in relation to the frame 129 and the type wheels for the purpose. The platen 130 is pivoted, as at 131, on one end of a lever 132 that is, in turn, pivoted as at 133 to a bracket 13, at a point intermediate its ends and has its other end pivoted, as at 135, to the free end of the movable armature 136 of a solenoid 137, the latter being supported on a bracket 138 secured to a wall of the casing 26. The paper tape 115 is fed from the supply reel or spool 113 past the printing area, defined by the several type wheels 102—108 and the engraved plate 129, to the winding reel or spool 114 intermittently and immediately following each printing operation which is accomplished by the energizing of the solenoid 137 to cause the lever 132 to forcibly move the platen 130 against the printing area. To that end, the paper tape 115 passes between two rollers 173 and 174, journaled in the frame 97, and has the required intermittent motion imparted to them through the medium of a toothed wheel or sprocket 175, the latter being commonly mounted with the outer roller 174. Cooperative with the teeth of the gear 175 is a pull rod 176 that has one end angled, as at 177, for engagement with the gear teeth and its other end connected to the lever 132. A guide 178 is secured to the frame 97 for the pull rod and a coil spring 179 is interposed between the latter and the frame 97 to hold the angled end in its operative relation to the gear teeth. The inner roller 173 may be knurled, as at 180, intermediate its ends, in order to have increased frictional bearing on the paper tape 115. Thus, upon movement of the platen 130 to the printing position, the angled end 177 rides over certain of the teeth of the gear 175 and, on the return stroke of the lever 132 to withdraw the platen to normal position of rest, it engages with a gear tooth in a position of readiness for the next succeeding printing operation.

Figure 10:
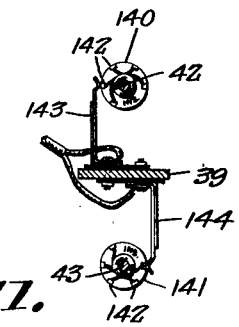
Figure 10 is a sectional detail taken on the line 10—10 of Figure 5.
Figure 11:
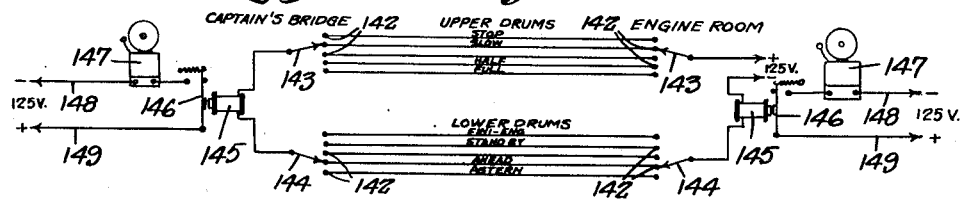
Figure 11 is a diagrammatical view of the alarm circuits of two distantly located transmitting indicators and showing their operative interrelation.
Figure 12:
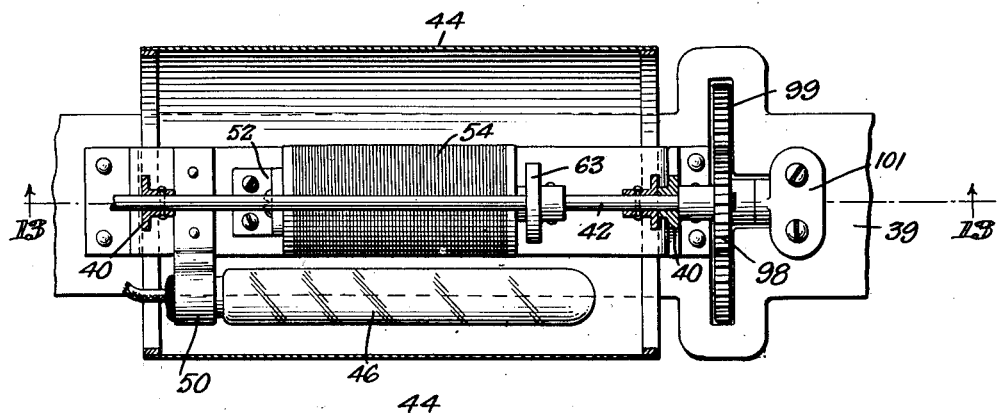
Figure 12 is a horizontal sectional detail taken on the line 12—12 of Figure 13.

Mounted on the upper and lower shafts 42 and 43, to the left of the brake mechanism, are insulated contact wheels 140 and 141, respectively, each of which is provided with five equidistantly spaced contacts 142, those of the upper wheel 140 being wiped by a spring contact finger 143 and those of the lower wheel 141 by a similar contact finger 144, whenever the signal drums 44 and 45 are at rest or set to an order or signal indicating position, the contact fingers being respectively secured to and insulated from the upper and lower sides of the main support 39, substantially as is shown in Figure 10. The contacts of the upper contact wheel 140 are electrically connected each to a circuit terminal on a current distributing panel 139 mounted on the upper side of the main support 39, and those of the lower contact wheel 141 similarly so to the circuit terminals on a second current distributing panel 139' that is secured to the lower side of the main support 39. The contacts 142 on the contact wheels 140 and 141 represent the five positions respectively of the signal drums 44 and 45, and are so arranged with respect to the legends thereon. These contacts 142 and the contact fingers 143 and 144 are so connected that, when the signal drums 44 and 45, at one station are set to the same order or signal indicating positions as are those at a distant station, electrical circuits at both stations are each closed on an electric alarm circuit controlling relay 145, which now acts to hold the alarm circuits at both stations open, after the manner as is depicted in Figure 11.

However, with movements of the signal drums 44 and 45, at one station, the circuit to the relays 145 at both stations are broken and the armatures 146 released to act to complete the alarm circuit at the latter stations, the alarms continuing to sound a warning until the operator at one station makes proper acknowledgment or repeat answer, which will place the signal drums in the same positions at both stations, when the circuits will again be closed on the alarm circuit controlling relays 145. By thus having the relays 145 of both stations energized to stop the alarms from sounding, the arrangement also permits of the sounding of the alarms upon failure of the power supply of the main circuits of the apparatus, since any interruption of the power supply in these main circuits will result in the de-energizing of the relays 145 for the closing of the alarm circuits by the release of the armatures 146 thereof, the alarm circuits being connected to separate sources of power, both with respect to each other and to the main circuits. Each of the alarm circuits includes an audible device, such as an electric bell 147, in series connection with the switching armature 146 of the relay 145 and the leads 148 and 149, from a suitable power source, such as a D. C., 125 v. supply.

Mounted on the rear wall of the casing 26 is a series of main control switches, preferably of the push-button type, nine of the same being employed to correspond to the number of order or signal indicating positions of the signal drums 44 and 45, and are designated 150; 151; 152; 153; 154; 155; 156; 157 and 158. These switches are to be separately actuated from the handle 35 on the angled controller arm 31—33 and, to this end, the handle 35 is pivotally mounted, as at 159, in its position on the shorter arm 33, the lower pivoted end of the handle being in the form of a cam 160 that is disposed in peripheral contact with the upper end of a plunger 161 mounted vertically of the arm 33. The controller arms 31 and 33 are made hollow to house within the same a mechanism with which the plunger 161 cooperates for the actuation of the several main control switches. This mechanism is comprised in an angled element 162 which is pivotally mounted within the arm 33, immediately beneath the plunger 161, and co-acts with a second plunger 163 that is slidably supported in aligned apertures formed in a pair of spaced partitions 164 and 165, extending transversely of the interior of the arm 33. Sleeved on the plunger 163, between the partitions 164 and 165 is a coiled spring 166 that has one end bearing against the partition wall 165 and its other end against a collar 167 on the plunger 163 to urge the latter toward the element 162 at all times. Disposed within the arm 31, of the index controller 31—33, is a lever 168 which is pivoted at its upper end, as at 169, to the outer end of the plunger 163, and at an intermediate point, as at 170, to the arm 31, its lower end, in turn, being pivoted, as at 171, to the outer end of another plunger 172 that is slidably supported in an aperture in the rear wall of the arm 31 and at a point thereon where it will align with any one of the push buttons of the several main control switches 150—158, during turning movements of the controller arm 31—33 on the bearing 24.

In the operation of the apparatus and system thus provided, and with two of the apparatus installed at stations, one remote from the other and in electrical connection with the required current supplies, the operator at the command station will grasp the handle 35 of the controller arm 31—33 and rotate the latter on its bearing 24 until the index 34 points to a selected order or signal indication on the dial face 27—28. When correctly positioned, the controller arm 31—33 will be held in place by the engagement of the detent 37 in a corresponding depression 38 in the bearing 24 and the plunger 172 will be aligned with the push button of a corresponding control switch 150—158. With this setting of the controller arm, the operator now swings the handle arm 31—33, the operator now swings the handle 35 on its pivot to depress the plunger 161, the motion of which is transmitted through the cooperative parts 162, 163 and 168, to the plunger 173 and by the latter to the push button of the control switch to be actuated. Upon the closing of the control switch, the circuit will be closed on the power sources for the sequential operation of the interconnected circuits and instrumentalities of the command apparatus, which, in addition to those previously described herein and is illustrated in Figure 16, are augmented by certain other circuits and instrumentalities to be hereafter described and as follows.

A separate control relay is provided for each of the nine positional movements of the signal drums 44 and 45, and each of the same is identified with legends corresponding to the legends on the signal drums and on the dial face 27—28, as well as by the numerical designations 181—189, inclusive. A positive lead 190, from a D. C., 125 v. source, connects the movable contacts of all of the control relays 181—189 and one contact of each of the main control switches 150—158 which have their remaining contacts in series connection, through a lead 191, with one side of each of the control relay coils, the other sides of the coils being connected to the positive power lead 190. Upon the closing of any one of the main control switches 150—158, a circuit is closed through the contacts of a trip relay 193 on a negative power lead 194. This trip relay 193 remains closed during each cycle of operation of the station apparatus and, upon the closing thereof, a circuit through another control relay 195 is closed on the brake solenoid 95 for the release of the brake mechanism from the shafts 42, 43 and shortly thereafter, a second control relay 196 is energized and acts to open the circuit on the brake solenoid 95 for the re-setting of the brake mechanism to hold the shafts 42 and 43 stationary.

These relays 195 and 196 are preferably of the telephone delayed action type for purposes which will presently be explained. However, upon the release of the brake mechanism, the necessary circuits are closed on the solenoids 54, 55, 71 and 73 for the rotation of the signal drums 44 and 45, and as soon as the selected order or signal is indicated at the oblong cutouts in the opaque area 28' of the dial face 27—28, the circuit is opened through the relay 196 on the solenoid 95 for the aforesaid resetting of the brake mechanism. With the braking of the shafts 42 and 43, and the signal drums 44 and 45, the solenoid 137 is energized and actuates the platen 130 for the printing of the order or signal record on the paper tape 115. Upon the return of the platen 130, by the deenergizing of the solenoid 137, the circuit is opened on the trip relay 193 and its operation results in the disconnection of all circuits from the power source at the negative lead 194, when the apparatus is in condition for a repeat operation. The delayed action of the relay 196, is preferable of .25 second duration, during which period the brake mechanism is permitted to center the signal drums 44 and 45, in their respective positions. Also, upon the closing of the main control switch selected at the moment for an order or signal transmission and recording, the circuit is closed on the relay 145 at the distant station for the sounding of a warning alarm at the bell 147, as hereinbefore explained.

A means is provided for automatically transferring the main current supply leads 190, 194, of the apparatus, from the normal D. C. source to an emergency D. C. source and, as shown in Figure 16, it is comprised in a transfer relay 197, which has its holding coil connected across the leads 190, 194, so that, when the coil is energized, its movable contacts are picked up and closed on the front contacts to allow the apparatus to draw operating power from the normal source. On failure of the normal supply, the movable contacts are released by the de-energization of the coil and close on the back contacts to connect leads 190', 194', with the leads 190, 194, when the apparatus will draw its operating power from an emergency source to which the leads 190', 194', are connected. Likewise, on the re-establishment of the normal supply, the holding coil is again energized and picks up the movable contacts to return them to their former circuit closing positions at the front contacts when the apparatus will again draw its operating power from the normal source.

Having thus fully described the invention, it is to be understood that various changes in minor detail of construction and arrangement of parts and circuits may be resorted to, without departing from the spirit of the invention, or its scope as claimed.

What is claimed is:

1. A two-way system of electrical communication, comprising means for electrically transmitting selected signals from a station of command to a station of compliance including a dial positioned on a head of a pedestal with indicia on the dial, a pivotally mounted handle with a pointer thereon adapted to be manually actuated so that the pointer registers with selected indicia on the dial, said dial having a centrally disposed transparent window therein, a pair of transparent parallel cylinders horizontally disposed in the head of the pedestal with indicia on the cylinders corresponding with indicia on the dial, means rotatably mounting the said cylinders whereby indicia thereon is displayed through the window of the dial, pinions on the cylinders, transversely disposed racks meshing with the pinions, solenoids positioned on the opposite ends of the racks adapted to influence the racks to rotate the cylinders, and a plurality of contacts positioned around the dial positioned to be contacted as the pointer arrives at selected positions to complete circuits to the solenoids, and identical means at the station of compliance for receiving the signals transmitted from the station of command and operable in a like manner to transmit to the latter a repetition of the received signals in acknowledgment of the receipt thereof, and means cooperative with both of the signal transmitting means for automatically indicating the identical signals transmitted, received and retransmitted.

2. In a dual system of communication, the combination which comprises a pair of pedestals, one remotely situated from the other, a substantially hollow cylindrical casing positioned on the upper end of each pedestal, each casing comprising a dial having indicia thereon and having a transparent centrally positioned window, a centrally positioned cylindrical bearing having radially spaced depressions therein mounted on the back of the casing, a hollow arm journaled on the said cylindrical bearing and having a spring actuated ball positioned to coact with the said depressions of the bearing, a pointer extended from the arm over the edge of the casing and positioned to register with indicia of the dial, a handle having cams thereon pivotally mounted on and extended from the end of the arm, a plurality of radially disposed switches in the casing and positioned concentric with the said cylindrical bearing, a pin carried by the arm and positioned to selectively close the said switches, means extended through the arm for actuating the pin by a cam of the handle for closing one of said switches, a cylinder having indicia thereon, means journaling the cylinder having the indicia thereon in the casing with the indicia positioned to show through the said window, solenoids positioned on opposite sides of the cylinder for rotating the cylinder to display indicia thereon through said window of the dial, and circuits connecting the switches of the cylindrical casing to a source of current supply and whereby operation of the handle on the end of the hollow arm completes a circuit through a switch in the casing as the swtich is actuated by the pin carried by the arm whereby indicia corresponding with indicia on the face of the dial and to which the pointer of the handle arm extends is displayed by the cylinder through the window of the dial on the casing of the remotely situated pedestal.

3. In a dual system of communication, the combination which comprises a pair of pedestals, one remotely situated from the other, a substantially hollow cylindrical casing positioned on the upper end of each pedestal, each casing comprising a dial having indicia thereon and having a transparent centrally positioned window, a centrally positioned cylindrical bearing having radially spaced depressions therein mounted on the back of the casing, a hollow arm journaled on the said cylindrical bearing and having a spring actuated ball positioned to coact with the said depressions of the bearing, a pointer extended from the arm over the edge of the casing and positioned to register with indicia of the dial, a handle having cams thereon pivotally mounted on and extended from the end of the arm, a plurality of radially disposed switches in the casing and positioned concentric with the said cylindrical bearing, a pin carried by the arm and positioned to selectively close the said switches, means extended through the arm for actuating the pin by a cam of the handle for closing one of said switches, a cylinder having indicia thereon, means journaling the cylinder having the indicia thereon in the casing with the indicia positioned to show through the said window, solenoids positioned on opposite sides of the cylinder for rotating the cylinder to display indicia thereon through said window of the dial, brakes including discs with radially disposed notches in the edges mounted to operate with the cylinder, solenoid actuated braking elements positioned to actuate the brakes for stopping and holding the cylinders in predetermined positions, and circuits connecting the switches of the cylindrical casing to a source of current supply and whereby operation of the handle on the end of the hollow arm completes a circuit through a switch in the casing as the switch is actuated by the pin carried by the arm whereby indicia corresponding with indicia on the face of the dial and to which the pointer of the handle arm extends is displayed by the cylinder through the window of the dial on the casing of the remotely situated pedestal.

HENRY J. ELLIOTT.

REFERENCES CITED

The following references are of record in the file of this patent:

UNITED STATES PATENTS

| Number | Name | Date |
| --- | --- | --- |
| 1,067,629 | Wood | July 15, 1913 |
| 2,223,678 | Elliott | Dec. 3, 1940 |